June 23, 1931.  C. H. VOGT  1,811,163
SAUSAGE WRAPPING METHOD AND APPARATUS
Filed Feb. 4, 1928    3 Sheets-Sheet 1
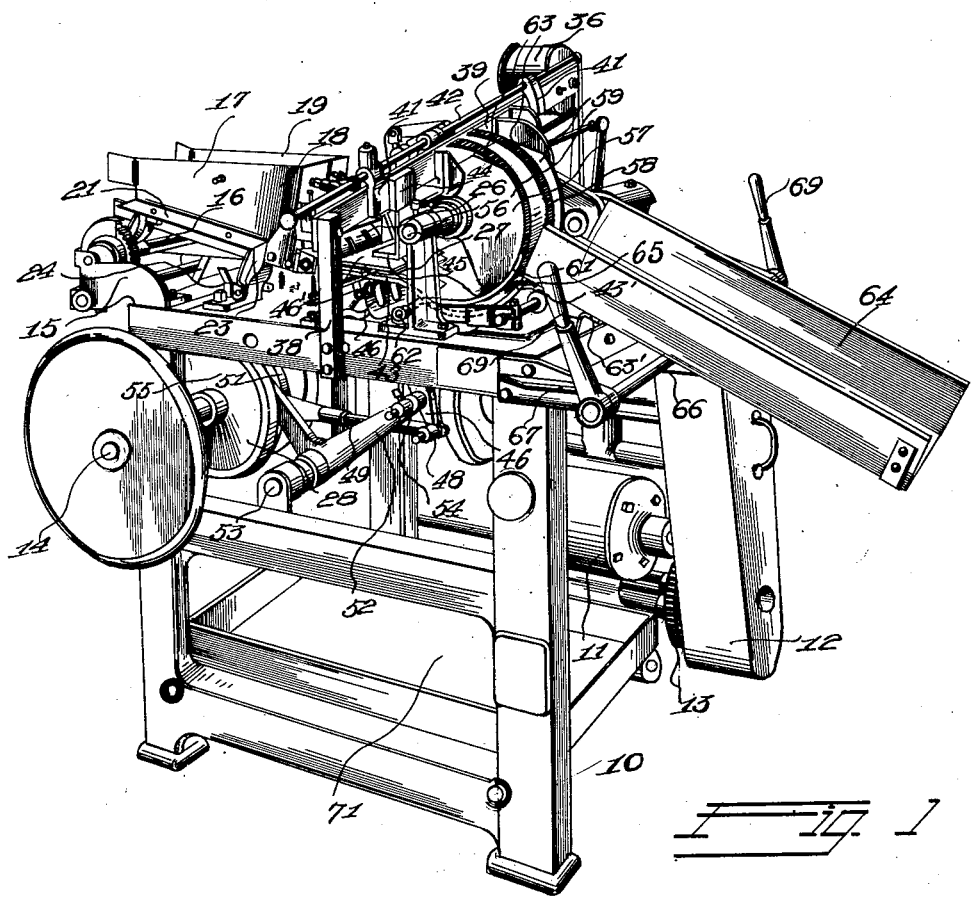
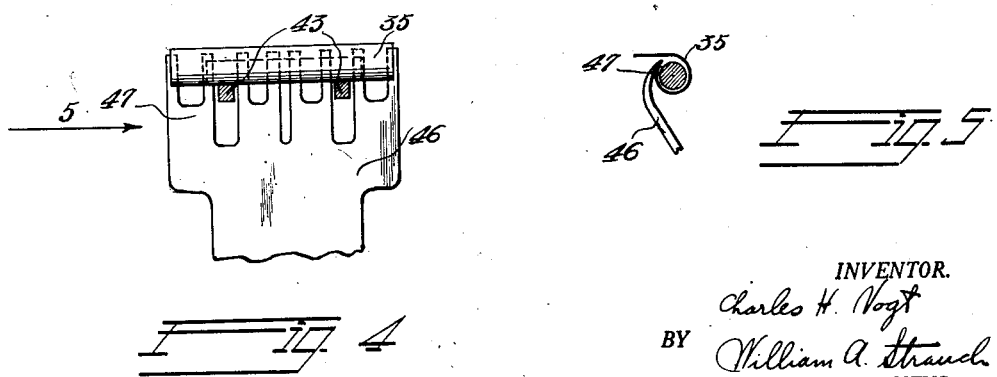
INVENTOR.
Charles H. Vogt
BY William A. Strauch
ATTORNEYS.

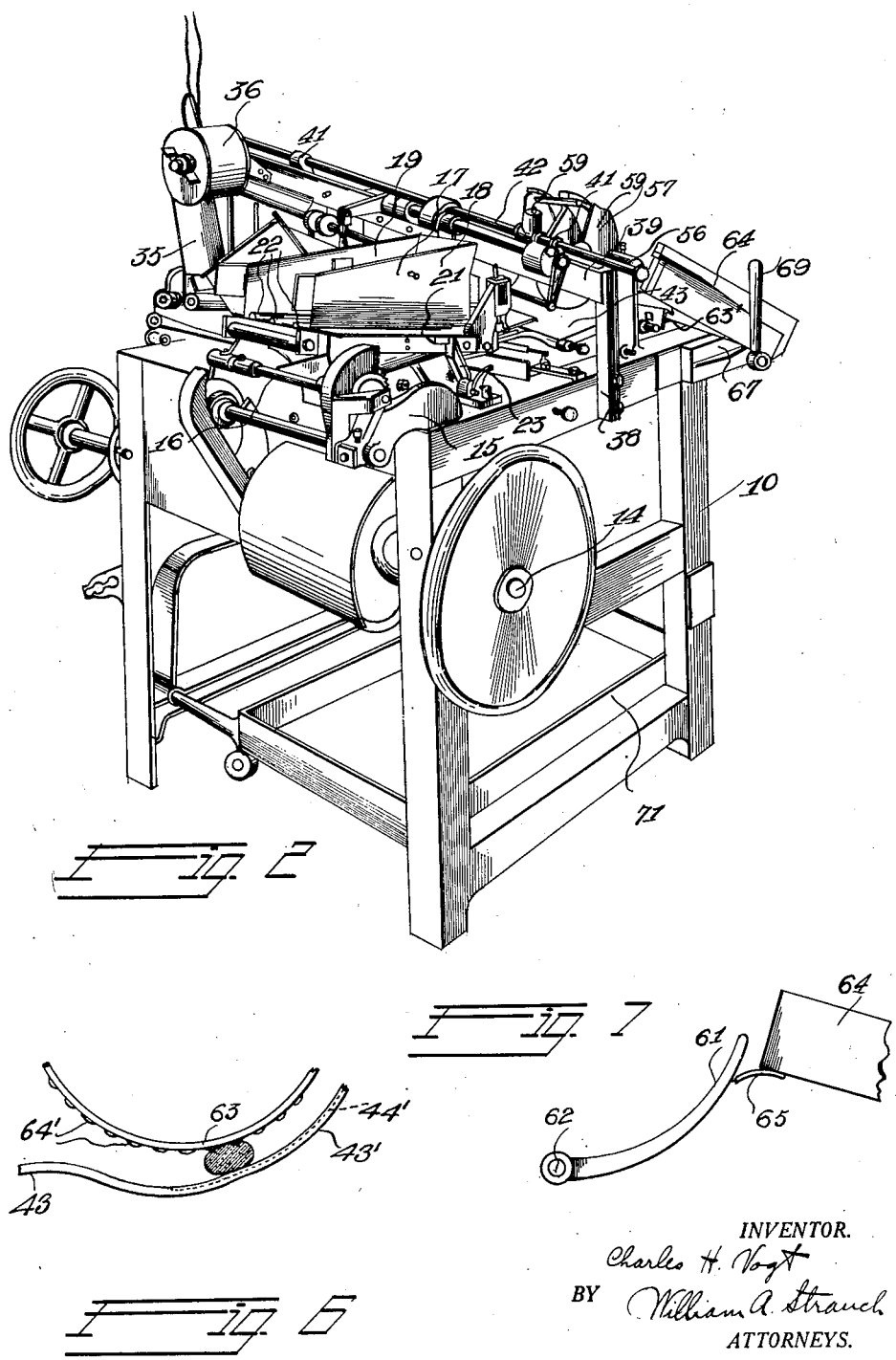

June 23, 1931. C. H. VOGT 1,811,163
SAUSAGE WRAPPING METHOD AND APPARATUS
Filed Feb. 4, 1928 3 Sheets-Sheet 3
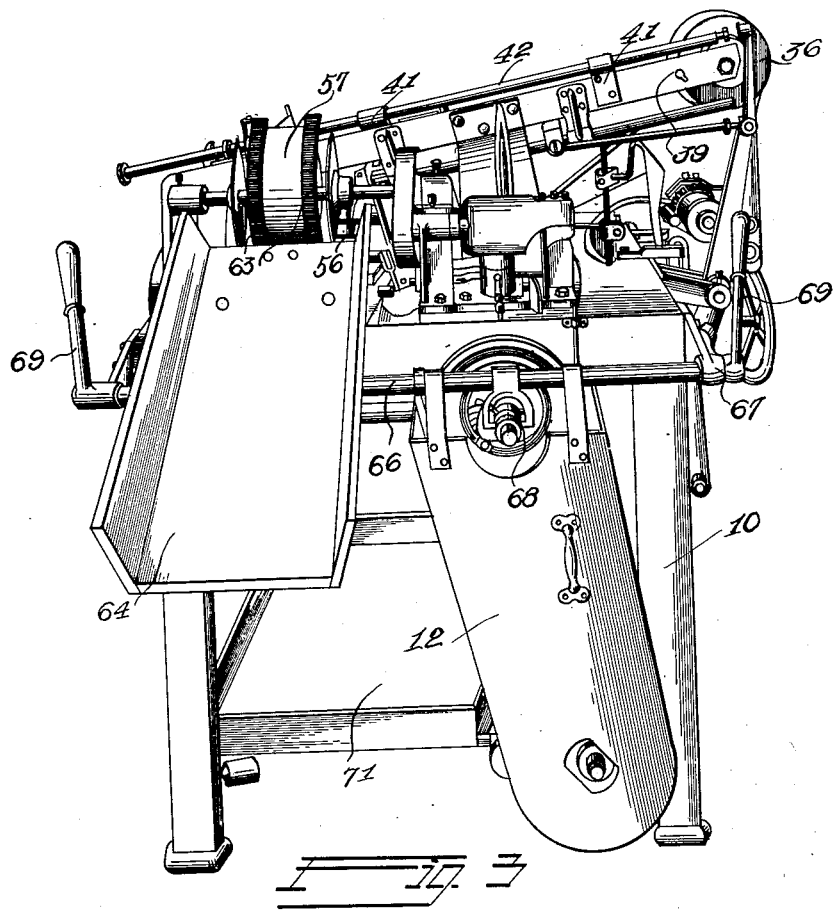
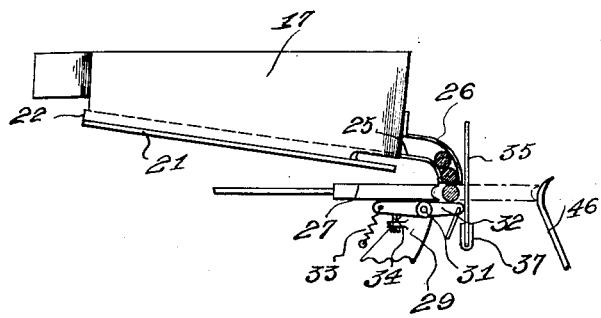
INVENTOR.
Charles H. Vogt
BY William A. Strauch
ATTORNEYS.

Patented June 23, 1931

1,811,163

UNITED STATES PATENT OFFICE

CHARLES H. VOGT, OF PHILADELPHIA, PENNSYLVANIA

SAUSAGE WRAPPING METHOD AND APPARATUS

Application filed February 4, 1928. Serial No. 251,871.

This invention relates to methods and apparatus for wrapping sausages, and more particularly to improved automatic methods and machines for wrapping sausage in economical and efficient manner at low cost.

Sausages of the link type commonly manufactured in animal casings, as at present marketed are unwrapped and are accordingly subjected to unsanitary conditions that necessarily arise in the repeated handling thereof from the time they are manufactured until they reach the consumer.

Certain kinds of sausages, such for example as casingless sausage, in the unwrapped state unless kept chilled, are subject to certain physical, chemical and bacteriological actions which rapidly render them unappetizing in appearance, undesirable, and in a comparatively short time unfit for use. By proper manufacture and wrapping of sausages of this type, the marketable life thereof and their appearance and quality is considerably improved, while the necessity for special chilling to make them marketable is obviated.

While highly desirable, the wrapping of sausages automatically because of their variable sizes, irregular shapes and yielding nature is difficult, and wrapping by hand is too laborious and expensive for commercial practice.

It is accordingly a primary object of this invention to provide a method for wrapping sausages automatically whereby the sausages are accurately and uniformly wrapped and whereby the sausages are wrapped with comparatively little expenditure of time and material, thus enabling manufacturers to furnish the sausages in a wrapped condition at comparatively little increase in price over that at which the unwrapped sausages are now furnished.

Another object of the present invention is the provision of a method of wrapping sausages whereby the sausages are individually enclosed within a wrapper the ends of which are securely twisted to hold the wrapper in engagement with the sausages and further providing extensions whereby the sausages may be grasped in the handling of the same.

A further object of my invention is the provision of a method of wrapping sausages whereby each sausage is enclosed within a transparent smooth wrapper by rolling the sausage within the wrapper with the ends of the wrapper held sufficiently against rotation so that the wrapper firmly engages the sausage and the ends thereof are twisted adjacent the ends of the sausage to securely hold the wrapper in position, making a product of neat and attractive appearance.

It is a still further object of the present invention to provide a machine for automatically wrapping sausages which is capable of wrapping the sausages accurately, neatly and expeditiously.

With these and such other objects in view as will become apparent in the following disclosure, reference will now be had to the accompanying drawings in which is disclosed a machine for wrapping sausages which is an improvement over the candy wrapping machine disclosed in U. S. Patents 1,597,931 and 1,597,932 issued August 31, 1926 adapting it to a successful operation of wrapping sausages, and to which reference will be had for the operating mechanism not entering into my improvements found essential in adapting said machine for handling sausage.

Fig. 1 is a perspective view of one form of wrapping machine in which the improvement of this invention may be embodied, the completely assembled machine being shown with the devices of this invention incorporated therein.

Fig. 2 is another perspective view of the machine of Fig. 1 turned counter-clockwise through an angle of about 90°.

Fig. 3 is a view in perspective of the machine of Fig. 1 turned clockwise through a 90° angle.

Figure 4 is a front elevational view of the tucker arm shown co-operating with a sausage with a wrapper being tucked around by the fingers thereof.

Figure 5 is an edge view as seen in the direction of the arrow 5 in Figure 4.

Figure 6 is a fragmental view showing the relation between the segmental roller members and the tracks whereby the sausages when engaged there between are deformed in the wrapping operation in order that this type of mechanism may successfully wrap sausage in smooth wrappers made from the material marketed under the trade name "Cellophane."

Figure 7 is a fragmental side elevational view showing the relation of the wrapper engaging arms to the discharge chute and yieldable arm limiting means carried by the chute.

Figure 8 is a fragmental side elevational view of the feed hopper and further disclosing the means for propelling the sausages therefrom to the rolling and wrapping mechanism.

Referring to the drawings by reference characters in which like characters designate like parts, 10 designates a frame of any suitable construction. Suitably supported within frame 10 is an electric motor 11 which is operatively associated with a suitable power transmitting means such as sprockets and chains within the housing 12 by suitable gearing 13.

Secured to and driven by the upper sprocket in housing 12 is a longitudinally extending shaft (not shown) which at its opposite end has a gear connection with the transversely extending shaft 14 as shown and described in Patent #1,597,931 to impart rotation thereto. The top portion of the frame 10 is in the form of a table and supports suitable brackets 15 (Figures 1 and 2) which support a transversely extending shaft 16 upon which the open feed end of hopper 17 is pivotally secured. Hopper 17 comprises side frames 18 and 19 and a base 21 comprising a plurality of longitudinally extending parallel slats 22, the base 21 and slats 22 being immovable relative to side frames 18 and 19. The opposite or discharge end of the hopper 17 is provided with downwardly projecting brackets 23 adapted to rest on the top of the frame 10 in which position the base 21 and slats 22 are slanted downwardly and forwardly to permit the sausages to travel through the hopper by action of gravity. The pivoted connection of the hopper 17 with shaft 16 permits the discharge end of the hopper to be raised to discontinue the feeding of the sausages to the wrapping mechanism, and in order to hold the discharge end elevated the hopper is provided with a supporting member 24 pivotally connected at one end thereof to the base of the hopper and adapted upon raising the discharge end of the hopper sufficiently to retard the feeding of the sausages to engage the top of frame 10 to hold the hopper in the elevated or non-operative position.

Located adjacent the forward or discharge end of hopper 17 and forming a continuation of the sides and bottom thereof are a pair of laterally spaced curved sausage end guide rails 25 (Figure 8) and similarly curved bars 26 project downwardly from the end of the hopper in parallel relation to rails 25 to direct the sausages onto the curved guide rails 25. As will be particularly noted upon inspection of Figure 8, the rails 25 and bars 26 are spaced apart sufficiently only to permit the passage of one sausage at a time. Suitably supported and guided for reciprocating movement by extensions of frame 10 is a forwardly projecting pusher 27 which is automatically timed and actuated by a lever provided with a roller engaging a cam groove on the cam 28 as is specifically disclosed in Patent #1,597,931. The forward end of the pusher 27 is normally positioned slightly in the rear of and adjacent to the lower ends of the guide rails 25 as shown in Figure 8 for feeding the sausages to the wrapping mechanism, and when actuated by the operating mechanism, assists in the forward movement of the sausages toward the wrapping mechanism. The forward end of the pusher 27 as shown in Figure 8 is concave and of a curvature to conform substantially to that of the sausages undergoing the wrapping operation as distinguished from the straight ended pusher shown in Patent #1,597,931.

A bracket 29 is secured to the top of frame 10 and is provided with a pair of aligned bearings 31 for pivotally supporting a resiliently mounted sausage receiving member 32, one end of whch is disposed under the ends of the guide rails 25 and in close proximity thereto as shown in Figure 8. A coiled spring 33 is connected between the opposite end of member 32 and the frame and normally holds this end in engagement with an adjustable stop member 34 as disclosed in said patent. Member 32 is adapted to successively receive the sausages as they emerge from the guide way formed by the rails 25 and bars 26 from which position the sausages are advanced forwardly by the pusher 27.

The wrappers for the sausages are fed into the machine in the form of a continuous strip of paper, Cellophane or similar material 35 from a roll 36 suitably supported from the frame of the machine, the strip 35 in its passage into the machine being turned at right angles by a suitable guide as shown in said patent to bring the paper strip into vertical position, as shown in Figure 8 before the sausages as they rest on the receiving member 32. The vertically disposed strip 35 is guided in a transversely disposed channel guide member 37 suitably supported from the frame work at the lower edge thereof for preventing the paper from curling prior to engagement of the sausages therewith. As the paper strip 35 is brought into position adjacent the receiver 32 individual wrappers of suitable length are successively cut from the strip. The mechanism for drawing the wrapper into position to be engaged by the sausages to be wrapped and for cutting the same into proper lengths is entirely automatic and is driven through suitable cams as fully disclosed in said Patent #1,597,931. Brackets 38 (Figure 2) are secured to the top of the frame 10 and support a transversely extending bar 39 at the upper ends thereof, which in turn supports a plurality of aligned bearings 41 within which is slidably mounted a rod 42 reciprocable transversely of the machine and having secured thereto at one end a suitable gripping mechanism operable to draw the paper across the machine and into position to be engaged by the sausages in the manner set forth for the engagement by hard sticks of candy in said patent.

In the operation of placing the wrappers about the sausages, the sausages are progressively forced forwardly from the receiving member 32 by the reciprocating pusher 27 on its forward movement, and are pushed against the wrapper which is severed from the strip at the proper time to provide an individual wrapper for each sausage. The sausages after leaving receiving member 32 and having individually received their wrappers are further advanced on straight sections of guide member 43 by the pusher 27 during which movement the wrapper is curled partially around the sausage. Guide member 43 consists of a substantially flat portion, indicated by the lead lines of numeral 43 in Figs. 1 and 6, is provided with an integral section 43' of substantially cylindrical curvature and is yieldingly supported in the manner fully set forth in United States Patent #1,597,932 and disclosed in Figs. 1 and 7 therein. As will be particularly noted from Figure 8 the forward end of the pusher 27 is concave presenting a surface substantially conforming to that of the sausages.

Depending brackets 44 carried by bar 39 are provided with substantially horizontal portions 45 to which pressure bars 46' are yieldingly secured which yieldingly engage the sausages as they move over the straight sections of guide 43 under influence of pusher 27, the forward end of which projects between the straight sections of guide 43 and pressure bars 46' in its extreme forward position.

When the pusher 27 has advanced an individual sausage forward to the full extent of its forward movement the sausage is further advanced by means of a tucker arm 46 (Figures 1, 4 and 5) which is provided with a plurality of curved fingers 47 adapted to enter between and on either side of guide members 43 to engage the sausage and move it forward, and at the same time engage the lower side of the wrapper tucking the same around the sausage as shown in Figures 4 and 5 in such manner that the wrappers will be in proper position to be firmly engaged with the sausage in the subsequent wrapping operations.

Tucker arm 46 is pivotally mounted as at 48 (Figure 1) upon a slide bar 49 which is provided with a forked end engaging shaft 14 and is reciprocated by means of a roller engaging the face of cam 51 as is set forth in Patent #1,597,931. A bell crank 52 is pivotally supported on shaft 53 and has one arm thereof pivotally secured to the tucker arm 46 by a pin 54 while the other arm of the bell crank carries a roller adapted to engage the face cam 55 to oscillate the bell crank. As a result of the movements imparted to the tucker arm 46 by the slide bar 49 and bell crank 52 the curved fingers 47 are given a compound movement causing the fingers 47 to follow and push the sausage and wrapper along the straight sections of guide 43 and the tucker arm and is then depressed and moved rearwardly into position to be raised into engagement with and behind the next succeeding sausage in a succeeding cycle of operations.

The receiving member 32 and guide 43 are preferably provided with cooperating means to draw the receiver and adjacent end of the guide member downwardly to permit the sausages to pass freely therebetween and the pressure bar 46', as disclosed in patents aforesaid mentioned, to prevent too great pressure on the sausages in this stage of their passage through the machine.

Suitably rotated by the motor 11 as for example by the means disclosed in said patents, is the transversely disposed shaft 56 to which is secured a rotatable segmental unit 57 secured by pivotal means as disclosed in said patents. Unit 57 comprises a central portion 58 of cylindrical curvature disposed between segmental flange members 59 which are provided with outer cylindrical edges projecting somewhat beyond the outer surface of portion 58 and are adapted to cooperate with wrapper engaging arms 61 pivotally mounted on spindles 62 (Figures 1 and 7) which are supported from the frame work. Arms 62 are provided with coiled springs at their pivots, as shown in Fig. 4 of said Patent #1,597,932, to constantly urge the arms outwardly to engage the flange members 59. Central portion 58 is provided with a pair of laterally spaced rubber strip members 63 having transverse ribs 64' in the nature of anti-skid gripping projections adapted to cooperate with the outer curved extension 43' of guide member 43 which is preferably provided with a rubber surface longitudinally grooved as at 44'.

A bracket 63' is secured to a portion of the frame 10 and supports a discharge-chute 64 for discharging the wrapped sausages from the upper end of the outer curved section 43' of guide members 43. Secured to the bottom of the chute 64 adjacent the front end thereof are yielding flat spring members 65 (Figure 7) adapted to yieldably limit the movement of arms 61.

As shown in Figure 3 a transversely extending shaft 66 is rotatably supported in suitable brackets 67 and is provided with a clutch 68 adapted to cooperate with the driving mechanism to stop or set same into operation at the will of the operator, the shaft 66 being provided with oppositely positioned actuating handles 69.

A removable pan 71 is provided within the base of the frame to catch waste material that may fall downward through the machine.

In the operation of the machine the sausages to be wrapped are successively fed into the hopper 17 in regular order in transverse disposition relative to the hopper and due to the downward slant of base 21 and slats 22 the sausages roll down the hopper from the feed end to the discharge end thereof and are successively guided from the hopper 17 by the opposite ends thereof being guided between cooperating guides 25 and bars 26 upon the adjacent end of the yieldably supported receiving member 32.

The mechanism as is specifically disclosed in Patents #1,597,931 and 1,597,932 operates in such timed relation that as the paper strip 35 is advanced in the guide 37 a distance equal to the width of an individual wrapper, pusher 27 is advanced to push the sausage then resting on the receiving member 32 into engagement with the strip at which instant the strip is severed to provide a wrapper for the sausage and the pusher further advances the sausage with the individual wrapper engaged thereby forward onto the straight sections of guide 43, the sausage being yieldably held in engagement with the guide by means of the pressure member 46' and the upward pressure of the adjustable spring supports for the guide.

Simultaneously with the rearward movement of pusher 27, tucker arm 46 is actuated to just clear the pusher and to bring the fingers 47 thereof into engagement with the wrapper and tuck the wrapper about the sausage as indicated in Figure 5 in which it will be noted that the outer fingers 47 extend to the outer edges of the wrapper. Tucker arm 46 is then moved to advance the sausage forwardly on guide member 43 to a position to be engaged by the segmental rotatable member 57 upon revolution thereof about the shaft 56.

The rotation of frame member 57 about the shaft 56 is in such timed relation to the movement of the tucker arm 46 that as each successive individual sausage is advanced to its extreme forward position by the tucker arm, the transversely grooved rubber members 63 engage the sausage adjacent the ends thereof and impart a rolling action to the sausage between the transversely grooved rubber members 63 and the longitudinally grooved curved guide portion 43'. At the same time the projecting ends of the wrapper are caught and pinched between yieldable arms 61 and the segmental flange members 59 and carried slidingly therebetween as the sausage is rolled and simultaneously advanced toward the discharge chute 64.

As the ends of the wrapper are substantially held against rotation and the sausage with the enveloping body portion of the wrapper is rotated or rolled about its axis the ends of the wrapper are twisted thus binding the wrapper into close engagement with the sausage and retaining it in such position.

As is shown in Figure 6 the relation of the guide 43 to the members 63 upon rotation of the members 63 into proximity to the guide portion 43' is such that the sausages are slightly deformed or compressed out of their cylindrical shape during the rolling action thereof by the gripping projections 64' to securely grip and wrap the wrapper closely around the sausage. While the sausage is deformed out of cylindrical shape while being rolled, the pressure exerted thereon is insufficient to break the skin of the sausage and as they leave the machine they assume their original cylindrical shape causing the wrappers to tightly engage the sausages.

The wrapped sausages drop into discharge chute 64 and pass into a suitable receiving vessel or onto a suitable conveyor.

The cooperation of the transversely grooved members 63 with the longitudinally grooved guide member 43 and deformation of the sausage during rolling insures a positive rolling action of the sausages and at the same time rolls the wrappers about the sausages in close and conforming engagement therewith.

From the foregoing disclosure it will be seen that improved methods for wrapping sausages are provided whereby sausages may be individually provided with wrappers that are accurately, neatly and securely engaged therewith, and further that an improved machine is provided for carrying my methods into effect which is comparatively simple in its construction.

Having set forth preferred embodiments only of my invention it is to be understood that my invention is not limited to the details herein before disclosed but is defined by the terms of the appended claims.

Accordingly, what I claim as new and desire to secure by Letters Patent is:

1. A method of wrapping sausages which comprises compressing each sausage out of its normal shape; providing the sausage with a wrapper while compressed; and permitting the sausage to expand within the wrapper to its normal shape to cause the wrapper to tightly engage the sausage.

2. A method of wrapping sausages which comprises loosely enclosing a sausage within a wrapper; subjecting the ends of the sausage within the wrapper to a rolling and deforming action; and restraining the ends of the wrapper against rolling sufficiently to provide a wrapper for the sausage which firmly engages same and is provided with twisted ends to securely hold the wrapper in position.

3. A method of wrapping sausages which comprises progressively bringing the sausages into proximity to a strip of wrapping paper; providing a wrapper for each individual sausage; progressively tucking the wrappers about the individual sausages; progressively subjecting the ends of the individual sausages within their wrappers to a rolling and distorting action with the ends of the individual wrappers restrained against rolling to provide the individual sausages with wrappers provided with tightly twisted ends; and progressively relieving the ends of the individual sausages from the deforming action to permit them to resume their normal shapes and thereby cause the wrappers to fit snugly.

4. In a sausage wrapping machine; a longitudinally grooved track; a rotating frame member provided with transversely grooved members adapted to cooperate with said grooved track; and means for progressively advancing the sausages forwardly on said grooved track into position to be engaged by said transversely grooved members upon rotation of said frame member.

5. In a sausage wrapping machine; a curved track for supporting the sausages to be wrapped; a rotatable frame member comprising sausage engaging members provided with anti-skid gripping projections adapted to cooperate with said track; means for progressively advancing the sausages together with the wrappers therefor onto said track; means for engaging the ends of said wrappers whereby upon rotation of said frame the sausages are engaged between said curved track and said sausage engaging members and subjected to a rolling action to twist the ends of the wrappers and confine the wrappers about the sausage.

6. The construction defined in claim 5 in which said curved track and said sausage engaging members are so related that the sausages when undergoing the rolling operation are compressed whereby upon disengagement of said sausage engaging members with the sausages the sausages expand within the wrappers to cause the wrappers to tightly engage same.

7. A method of wrapping sausages and the like which comprises loosely enclosing a sausage within a wrapper of greater length than the sausage; rolling the sausage and, near the ends thereof, pressing a portion of the wrapper downwardly into the sausage while simultaneously twisting the projecting ends of the wrapper; and releasing the pressure on the ends of the sausage to permit them to assume their normal shape.

8. A method of wrapping sausages and the like which comprises loosely enclosing a sausage within a wrapper of greater length than the sausage; rolling the sausage and deforming it by pressing a series of integral wrapper portions downwardly into the body of the sausage to prevent relative rotative slipping movement between the latter and its wrapper, while simultaneously closing the ends of the wrapper, and relieving the encased sausage from the rolling and deforming action.

9. In the method defined in claim 8, during the rolling operation, maintaining a fractional peripheral portion of the wrapper in depressed engagement with the sausage to prevent substantial lateral slipping movement of the latter with respect to its wrapper.

10. In a sausage wrapping machine, a curved track having a curved surface, a rotatable sausage engaging member having an expansive convex surface positioned adjacent said concave surface of said curved track, pivoted wrapper engaging arms disposed contiguous to said track, segmental flange members rotatable with said member for cooperating with said arms to engage the wrappers, a discharge chute adjacent the end of said track and the free ends of said pivoted arms, and resilient means carried by said chute to yieldingly limit the movement of the free ends of said arms toward said chute.

11. In a sausage wrapping machine, a track having a concavely curved surface for supporting the sausages to be wrapped, a rotatable member spaced from the said concave surface, said member having a cylindrically curved outer surface provided with a pair of spaced sausage engaging members adjacent its lateral edges, means for progressively advancing the sausages together with the wrappers therefor onto said track and into the space between the same and said rotatable member, means for driving the rotatable member to roll the sausages along the track, said sausage engaging members being provided with anti-skid projections to ensure positive rolling of the sausages along said track, and means for twisting the ends of the wrappers during the rolling operation.

12. In the construction defined in claim 11, said anti-skid projections being of resilient material, and said concavely curved track portion being provided with longitudinal grooves for guiding the sausages during the rolling movement thereof.

In testimony whereof I affix my signature.

CHARLES H. VOGT.